(12) United States Patent
Winn et al.

(10) Patent No.: US 9,869,204 B2
(45) Date of Patent: Jan. 16, 2018

(54) INTEGRATED INNER CASE HEAT SHIELD

(71) Applicant: United Technologies Corporation, Hartford, CT (US)

(72) Inventors: Joshua Daniel Winn, Ellington, CT (US); Anthony P. Cherolis, Hartford, CT (US); Steven D. Porter, Wethersfield, CT (US); Christopher Treat, Manchester, CT (US); Kevin Zacchera, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 14/640,323

(22) Filed: Mar. 6, 2015

(65) Prior Publication Data

US 2016/0258322 A1  Sep. 8, 2016

(51) Int. Cl.
| | |
|---|---|
| *F01D 25/12* | (2006.01) |
| *F01D 25/14* | (2006.01) |
| *F01D 25/24* | (2006.01) |
| *F01D 25/28* | (2006.01) |
| *F01D 25/16* | (2006.01) |
| *F01D 9/06* | (2006.01) |

(52) U.S. Cl.
CPC ........... *F01D 25/145* (2013.01); *F01D 9/065* (2013.01); *F01D 25/243* (2013.01); *F01D 25/28* (2013.01); *F01D 25/12* (2013.01); *F01D 25/162* (2013.01); *F01D 25/24* (2013.01); *F05D 2260/20* (2013.01); *Y02T 50/672* (2013.01); *Y02T 50/676* (2013.01)

(58) Field of Classification Search
CPC ...... F01D 25/145; F01D 9/065; F01D 25/125; F01D 25/18; F01D 25/243; F01D 25/28; F01D 25/12; F01D 25/162; F01D 25/24; F05D 2260/20; F05D 2260/231; Y02T 50/672; Y02T 50/676
See application file for complete search history.

(56) References Cited

U.S. PATENT DOCUMENTS

| | | | | |
|---|---|---|---|---|
| 4,749,029 | A | * | 6/1988 | Becker .................... F23R 3/002 165/169 |
| 4,920,742 | A | | 5/1990 | Nash et al. |
| 4,987,736 | A | | 1/1991 | Ciokajilo et al. |
| 5,174,714 | A | * | 12/1992 | Plemmons ............ F01D 25/145 29/888.01 |

(Continued)

FOREIGN PATENT DOCUMENTS

WO  2014052007  4/2014

OTHER PUBLICATIONS

European Search Report for European Patent Application No. 16158692, dated Jul. 15, 2016.

*Primary Examiner* — Woody Lee, Jr.
*Assistant Examiner* — Eric Zamora Alvarez
(74) *Attorney, Agent, or Firm* — Carlson, Gaskey & Olds, P.C.

(57) ABSTRACT

A mid-turbine frame for a gas turbine engine according to an example of the present disclosure includes, among other things, a first frame case, a flange coupled to the first frame case, and a heat shield adjacent to the flange and between adjacent spokes. A method of cooling a portion of a gas turbine engine is also disclosed.

18 Claims, 5 Drawing Sheets

(56) References Cited

U.S. PATENT DOCUMENTS

| | | | | |
|---|---|---|---|---|
| 5,197,766 A | * | 3/1993 | Glover | F16L 23/167 |
| | | | | 210/165 |
| 5,273,397 A | * | 12/1993 | Czachor | F01D 25/14 |
| | | | | 415/116 |
| 5,292,227 A | * | 3/1994 | Czachor | F01D 25/162 |
| | | | | 415/142 |
| 5,335,490 A | * | 8/1994 | Johnson | F23R 3/20 |
| | | | | 60/740 |
| 5,483,792 A | * | 1/1996 | Czachor | F01D 25/162 |
| | | | | 60/796 |
| 5,634,767 A | * | 6/1997 | Dawson | F01D 25/246 |
| | | | | 415/134 |
| 8,500,392 B2 | * | 8/2013 | Durocher | F01D 9/06 |
| | | | | 415/116 |
| 2005/0199445 A1 | | 9/2005 | Zalewski et al. | |
| 2010/0275572 A1 | * | 11/2010 | Durocher | F01D 9/065 |
| | | | | 60/39.08 |
| 2011/0079019 A1 | | 4/2011 | Durocher et al. | |
| 2011/0081237 A1 | | 4/2011 | Durocher et al. | |
| 2013/0189071 A1 | | 7/2013 | Durocher et al. | |
| 2014/0007588 A1 | | 1/2014 | Sanchez et al. | |
| 2014/0007589 A1 | * | 1/2014 | Zimmermann | F01D 25/08 |
| | | | | 60/796 |
| 2014/0093371 A1 | | 4/2014 | Vo et al. | |

\* cited by examiner

INTEGRATED INNER CASE HEAT SHIELD

BACKGROUND

This disclosure relates to shielding a component of a gas turbine engine, and more particularly to a shielding arrangement for a component of a mid-turbine frame.

Gas turbine engines can include a fan for the propulsion of air and to cool components. The fan also delivers air into a core engine where it is compressed. The compressed air is then delivered into a combustion section, where it is mixed with fuel and ignited. The combustion gas expands downstream over and drives turbine blades.

Some turbine engines include a mid-turbine frame configured to transfer loads between a bearing compartment and other portions of the engine static structure. The mid-turbine frame may include one or more static airfoils between inner and outer cases of the mid-turbine frame to direct the flow of products of combustion to the turbine blades. One or more service lines may extend through the airfoils.

SUMMARY

A mid-turbine frame for a gas turbine engine according to an example of the present disclosure includes a first frame case, a flange coupled to the first frame case, and a heat shield adjacent to the flange and between adjacent spokes.

In a further embodiment of any of the foregoing embodiments, the heat shield includes a first portion and a second portion. The first portion extends in a circumferential direction. The second portion extends in a radial direction and abuts the first frame case.

In a further embodiment of any of the foregoing embodiments, a perimeter of the heat shield mates with a perimeter of the flange.

In a further embodiment of any of the foregoing embodiments, the flange is at least partially received in the first frame case.

In a further embodiment of any of the foregoing embodiments, the heat shield defines a cooling cavity, and the cooling cavity has an inlet bounded by the first frame case and an outlet bounded by a conduit coupled to the flange.

A further embodiment of any of the foregoing embodiments, the mid-turbine frame includes a second frame case coaxial with the first frame case. The conduit extends through an airfoil between the first and second frame cases.

In a further embodiment of any of the foregoing embodiments, the first and second frame cases bound a core flow path, and the airfoil is positioned in the core flow path.

In a further embodiment of any of the foregoing embodiments, the conduit includes a distal portion extending through the airfoil and a proximal portion coupled to the flange. The distal portion is surrounded by an insulated sheath terminating at the proximal portion, and the heat shield extends a distance along the proximal portion.

In a further embodiment of any of the foregoing embodiments, the conduit is configured to communicate fluid with a bearing compartment.

A further embodiment of any of the foregoing embodiments, the mid-turbine frame includes a second frame case, and a plurality of spokes connecting the first and second frame cases. The heat shield is spaced in a circumferential direction from each of the plurality of spokes.

A gas turbine engine according to an example of the present disclosure includes a mid-turbine frame axially between a first turbine and a second turbine. The mid-turbine frame includes a plurality of airfoils radially between an inner frame case and an outer frame case, a plurality of flanges coupled to the inner frame case, and a plurality of conduits between the inner and outer frame cases. The plurality of conduits is coupled to the plurality of flanges. A plurality of localized heat shields each corresponds to one of the plurality of flanges.

In a further embodiment of any of the foregoing embodiments, at least one of the plurality of conduits is configured to communicate cooling airflow with a bearing compartment.

In a further embodiment of any of the foregoing embodiments, the plurality of conduits is an oil supply line and an oil scavenge line each coupled to a bearing compartment.

In a further embodiment of any of the foregoing embodiments, opposed walls of the inner and outer frame cases bound a core flow path, and the plurality of airfoils are located in the core flow path.

In a further embodiment of any of the foregoing embodiments, the plurality of localized heat shields are arranged between the plurality of airfoils and surfaces of the plurality of flanges.

In a further embodiment of any of the foregoing embodiments, each heat shield of the plurality of heat shields is spaced circumferentially about the inner frame case, and each heat shield of the plurality of heat shields defines a cavity between the inner frame case and one of the plurality of flanges.

A method of cooling a portion of a gas turbine engine according to an example of the present disclosure includes directing cooling airflow through an inlet between a turbine case and a heat shield, and directing cooling airflow from the inlet to a cavity. The cavity is defined between the heat shield and a flange, and the cavity is defined between the heat shield and a conduit coupled to the flange.

A further embodiment of any of the foregoing embodiments, the method of cooling includes directing cooling airflow from the cavity to an outlet between the conduit and the heat shield.

In a further embodiment of any of the foregoing embodiments, the heat shield is arranged between an airfoil receiving the conduit and surfaces of the flange.

In a further embodiment of any of the foregoing embodiments, the conduit is coupled to a bearing compartment.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
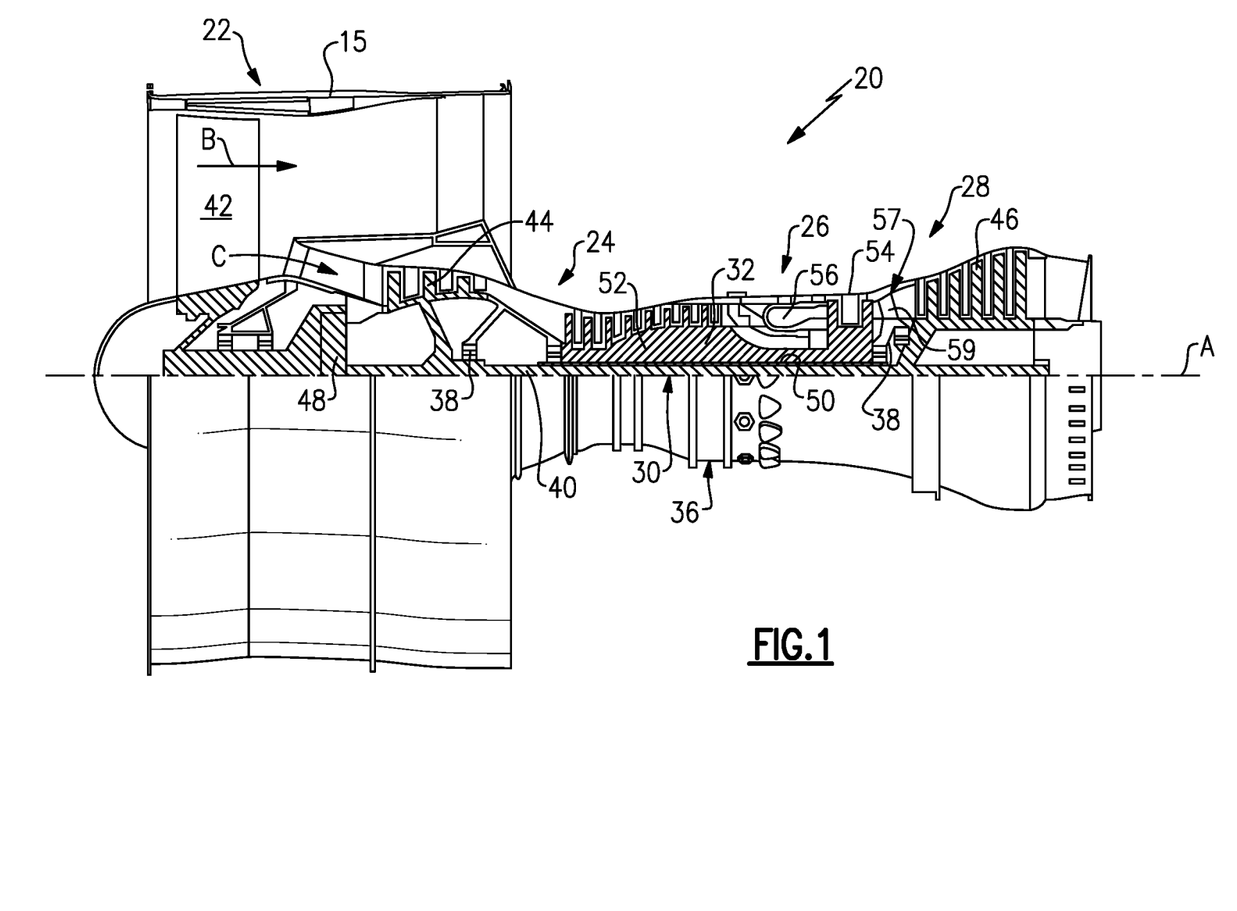
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
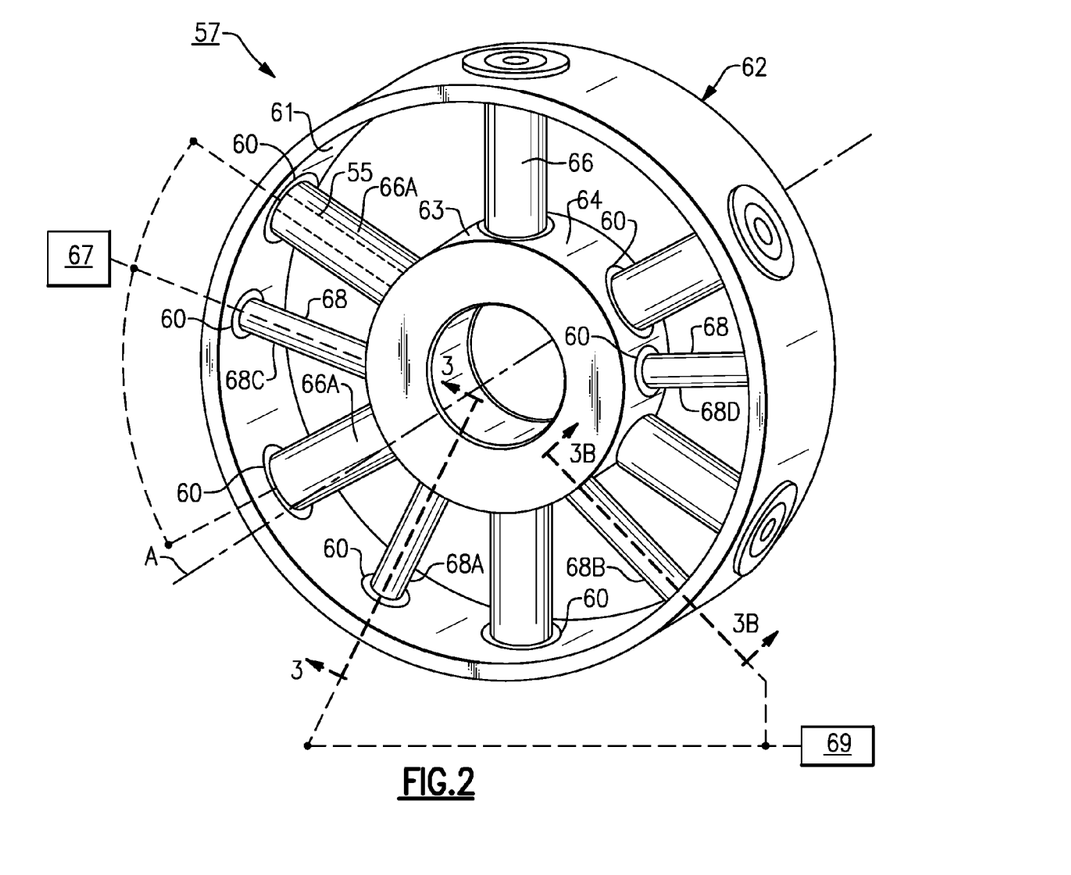
FIG. 2 schematically shows a perspective view of a mid-turbine frame.

FIG. 2 is a schematic perspective view of the mid-turbine frame 57. The mid-turbine frame 57 includes an outer frame case 62 and an inner frame case 64 which can be arranged about the central or engine axis A. The mid-turbine frame 57 is arranged axially between the low pressure turbine 46 (or first turbine) and the high pressure turbine 54 (or second turbine) shown in FIG. 1. One or more spokes or tie rods 66 are distributed around a circumference of the inner frame case 64 and extend radially between an inner diameter 61 of the outer frame case 62 and an outer diameter 63 of the inner frame case 64 to provide structural support between the outer and inner frame cases 62, 64. For the purposes of this disclosure, the axial and radial directions are in relation to the central axis A unless stated otherwise.

The inner frame case 64 supports the rotor assembly via the bearing system 38 (shown in FIG. 1), and distributes the force from the inner frame case 64 to the outer frame case 62 via the spokes 66. The outer frame case 62 is configured to transfer loads from the inner frame case 64 to other portions of the engine static structure 36 (shown in FIG. 1). In some examples, one or more spokes $66_A$ define cooling passage(s) 55 (shown schematically in dashed line) to communicate cooling airflow from a coolant source 67 to the bearing compartment 38 or to a rotor assembly of the turbine section 28. Coolant sources 67 can include, but are not limited to, bleed air from an upstream stage of the compressor section 24, bypass air, or a secondary cooling system aboard the aircraft, for example.

One or more service lines 68 are distributed around the circumference of the inner frame case 64 to provide a path between the outer and inner frame cases 62, 64. The service lines 68 can be positioned between adjacent pairs of spokes 66. The service lines 68 can include, but are not limited to, a conduit, a pressurized lubrication or oil supply line $68_A$, a lubrication or oil scavenge line $68_B$, a coolant supply line $68_C$ coupled to the coolant source 67, and a secondary lubrication or oil drain line $68_D$, for example.

The lubrication supply and scavenge lines $68_A$, $68_B$ are configured to communicate lubrication between the bearing compartment 38 and a lubrication source 69, which can include a reservoir and lubrication pump, for example. In this manner, the bearing compartment 38 is lubricated and cooled during operation of the engine 20. Although six spokes 66 and four service lines 68 are shown in FIG. 2, the particular number of spokes 66 and service lines 68 can be determined based on the needs of a particular situation in view of the teachings herein.

Each of the spokes 66 and service lines 68 extends within an airfoil 59 or static vane (shown in FIGS. 1 and 3) arranged in the core flow path C (shown in FIG. 1). Accordingly, portions of the spokes 66 and service lines 68 are adjacent to areas of the airfoil 59 that are subject to relatively high temperatures in the core flow path C.

Figure 3:
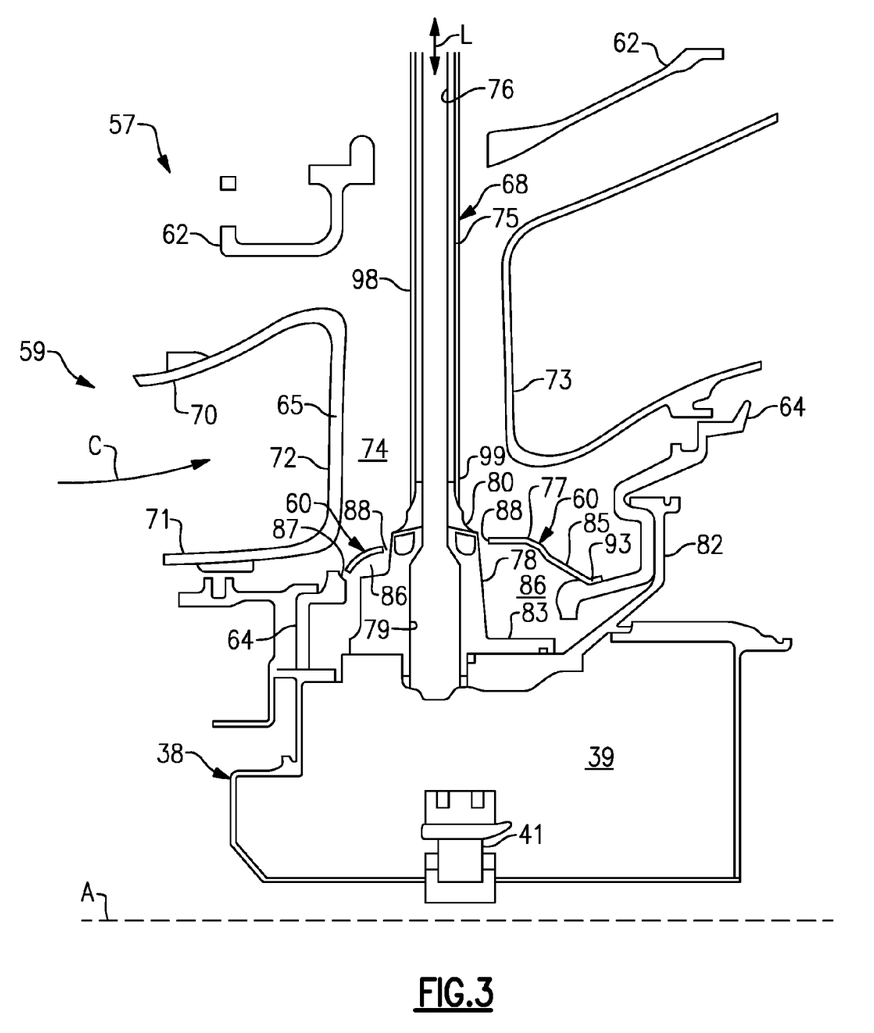
FIG. 3 illustrates a cross-sectional view of the mid-turbine frame taken along line 3-3 of FIG. 2.

FIG. 3 is a highly schematic view of the mid-turbine frame 57 including a localized heat shield 60. Although the localized heat shield 60 is shown with service line 68, such as the lubrication supply or scavenge lines $68_A$, $68_B$ shown in FIG. 2, it should be understood that any of the spokes 66 or service lines 68 can be provided with a heat shield 60. Other portions of the engine 20 can also benefit from the teachings herein, including conduits coupled to portions of the low pressure turbine 46, the high pressure turbine 54, an intermediate turbine for a three-spool engine, or adjacent structures.

The service line 68 extends in a radial direction from an outer frame case 62 through the airfoil 59 to an inner frame case 64. The airfoil 59 includes an airfoil section 65 extending between from an outer platform 70 to an inner platform 71. In the illustrated example, the airfoil section 65 and the outer and inner platforms 70, 71 are integrally formed, and are all positioned radially inward of the outer frame case 62 and radially outward of the inner frame case 64. In alternative examples, the airfoil section 65 and the outer and inner platforms 70, 71 include multiple components attached together. The outer and inner platforms 70, 71 bound or otherwise define a portion of the core flow path C at the mid-turbine frame 57. The airfoil section 65 extends axially from a leading edge 72 to a trailing edge 73 to direct the flow of combustion products in the core flow path C.

The airfoil 59 defines an airfoil cavity 74 for receiving a spoke 66 or a service line 68. The airfoil cavity 74 can be configured to communicate cooling airflow from the coolant source 67 (shown in FIG. 2) to select portions of the airfoil 59 to provide impingement or film cooling, for example. Radially inward portions of the airfoil cavity 74 can be bounded or otherwise defined by the outer and inner frame cases 62, 64. In alternative embodiments, separate cavities are defined between the airfoil 59 and the outer and inner frame cases 62, 64.

An insulated sheath 75 can be arranged about portions of the service line 68 to reduce exposure of radiation or heat from the airfoil 59. In the illustrated example, the service line 68 includes a distal (or first) portion 98 extending through the airfoil 59 and a proximal (or second) portion 99 coupled to the flange 78. The distal portion 98 is surrounded by the insulated sheath 75 which extends to, or terminates at, the proximal portion 99 or at the transfer tube 80.

The service line 68 is coupled to a tube foot or flange 78 adjacent the inner frame case 64. In one embodiment, a transfer tube 80 couples the service line 68 and the flange 78 to each other. An inner path 79 within flange 78 is configured to communicate flow or lubricant L between an inner passage 76 of the service line 68 and a bearing cavity 39 within the bearing compartment 38. The lubricant L is communicated between the flange 78 and one or more bearings 41 via the bearing cavity 39. The bearing 41 is configured to support a shaft such as the inner shaft 40 (shown in FIG. 1) radially inward of the bearing 41. As shown, the flange 78 abuts against, or is coupled to, a bearing support 82 coupled to or integral with the frame case 64. The flange 78 extends radially outward through the inner frame case 64 toward the airfoil cavity 74. In alternative examples, the flange 78 is coupled or attached to one of the outer and inner frame cases 62, 64 of the mid-turbine frame 57.

In prior arrangements, surfaces 83 of the flange 78 bound or otherwise define a portion of the airfoil cavity 74. Accordingly, the surfaces 83 may be exposed to radiation from the core flow path C via airfoil 59, thereby elevating the temperature of lubricant L communicated from the service line 68 to the bearing cavity 39 to an undesirable level.

Figure 4A:
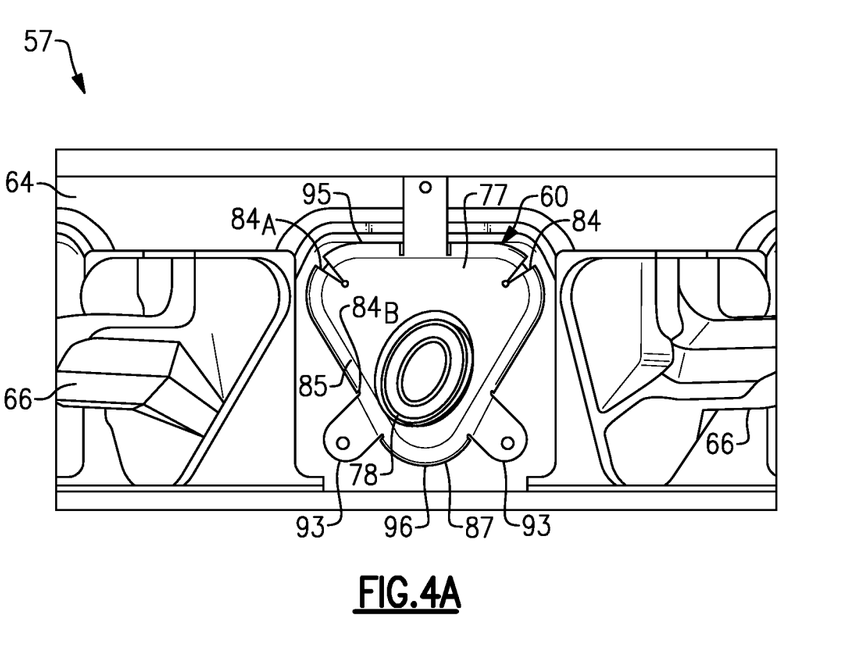
FIG. 4A is a top view of selected portions of a mid-turbine frame having a localized heat shield.
Figure 4B:
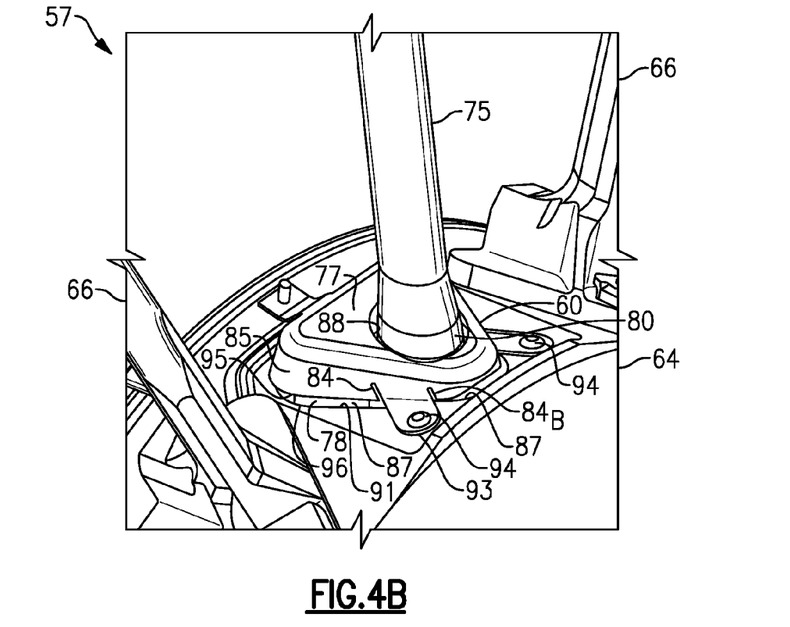
FIG. 4B is a perspective view of selected portions of the mid-turbine frame of FIG. 4A.
Figure 4C:
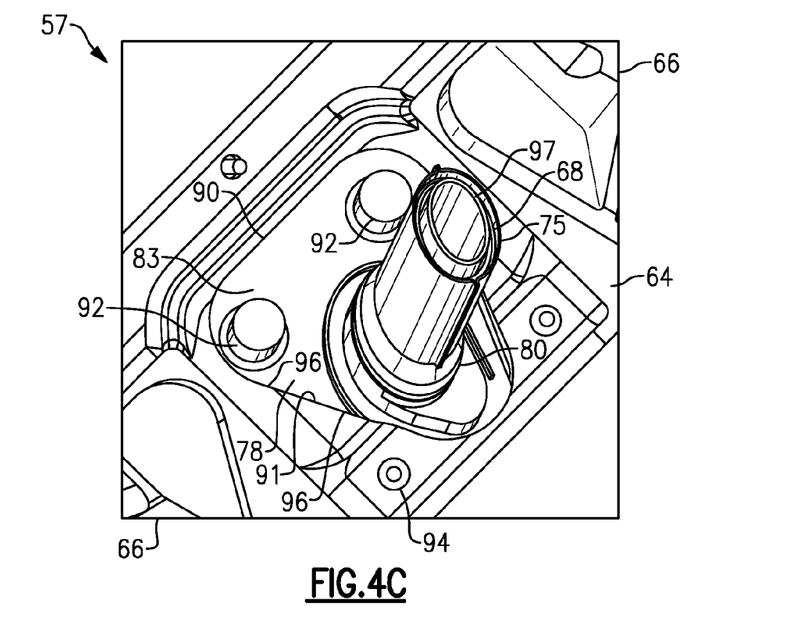
FIG. 4C is a perspective view of selected portions of the mid-turbine frame of FIG. 4B with the heat shield uninstalled.

In the illustrated example, the heat shield 60 includes a first portion 77 configured to receive the service line 68 and a second portion 85 configured to be arranged adjacent to a perimeter 90 of the flange 78 (shown in FIG. 4C). The second portion 85 of the heat shield 60 abuts against, or is coupled to, one of the outer and inner frame cases 62, 64.

The heat shield 60 is located radially between the flange 78 and a portion of the airfoil 59. At least a portion of the heat shield 60 is positioned in a line-of-sight between surfaces 83 of the flange 78 and portions of the airfoil 59 such that the flange 78 is at least partially shielded from radiation or heat emitted from the airfoil 59.

The heat shield 60 may extend a radial distance along the proximal portion 99 or the transfer tube 80 to reduce a temperature of lubricant L within an inner passage 76 of the service line 68. In some examples, the mid-turbine frame 57 includes a plurality of localized heat shields 60 (illustrated schematically in FIG. 2) each corresponding to one of a plurality of flanges 78.

The heat shield 60 can be made of various materials to shield the flange 78 from radiation including, but not limited to, a steel alloy, such as a nickel based super alloy, stainless steel, a high-temperature composite or the like. The heat shield 60 can be formed utilizing various techniques, such as stamping or casting processes. The heat shield 60 can include one or more cutouts 84 (shown in FIGS. 4A and 4B) to assist in formation of the heat shield 60. The cutouts 84 can be defined at $84_A$ (FIG. 4A) or $84_B$, for example, or another location depending on the needs of a particular situation.

The heat shield 60 is arranged to define a localized cooling cavity 86. The localized cooling cavity 86 is provided with one or more leakage gaps such as inlet 87 and outlet 88 to communicate cooling airflow to the flange 78. In the illustrated example, the inlet 87 is defined by the inner frame case 64 and the heat shield 60, and the outlet 88 in the shape of a circumferential ring or annulus defined by the service line 68 and the heat shield 60. In another example, the inlet 87 is partially defined by the outer frame case 62.

In the illustrated example, cooling airflow circulates or is directed through the inlet 87 where it accumulates in the localized cooling cavity 86. The cooling airflow impinges on surfaces 83 of the flange 78 and reduces a temperature of the flange 78 and the lubricant L in the inner path 79 of flange 78. Relatively warm cooling airflow is then directed from the localized cooling cavity 86 toward the outlet 88. As the cooling airflow passes through the outlet 88 in to the airfoil cavity 74, radiation or heat exposure on the flange 78 is reduced, which in turn can reduce the amount of lubricant L needed to cool the bearing compartment 38 because a temperature of the lubricant L entering bearing compartment 38 is reduced. Reductions in radiation or heat exposure to the flange 78 can reduce flange warp, the formation of oxidation deposits in the lubricant L such as "coke" or "coking", and leakage of lubricant L from the bearing compartment 38 due to thermal expansion of the flange 78.

FIGS. 4A to 4C show selected portions of the mid-turbine frame 57 shown in FIG. 3. As shown in FIG. 4A, the localized heat shield 60 can be spaced circumferentially from an adjacent pair of spokes 66 coupled to the inner frame case 64. As shown in FIG. 4C, the heat shield is removed. The flange 78 can be received in, or extend through, a cutout or recess 91 within the inner frame case 64. The flange 78 can be secured utilizing one or more fasteners 92, such as one or more bolts or mating portions to accept corresponding bolts. The recess 91 is dimensioned to facilitate removal of the flange 78 from the inner frame case 64 during maintenance operations, for example.

The heat shield 60 can be coupled to the inner frame case 64 utilizing various techniques. In some embodiments, the heat shield 60 includes one or more tabs 93 configured to couple the heat shield 60 to the inner frame case 64. Fasteners 94 such as threaded bolts or rivets can be utilized to attach the tabs 93 to the inner frame case 64, thereby facilitating disassembly and repair. In alternative embodiments, the heat shield 60 is attached to the inner frame case 64 utilizing welding or brazing techniques.

The heat shield 60 can be configured having various geometries to reduce the amount of radiation communicated from an adjacent airfoil 59 to the flange 78. For example, the heat shield 60 can be configured to correspond or mate to a geometry of the flange 78 and/or the recess 91. In another example, a perimeter 95 of the second portion 85 of the heat shield 60 can be configured to correspond or mate to a perimeter 96 of the recess 91. The heat shield 60 can be arranged radially outward of the recess 91. In this arrangement, the perimeter 96 or overall dimension of the recess 91 can be reduced while accommodating the flange 78 within desired manufacturing tolerances. This arrangement also allows the heat shield 60 to be relatively insensitive to manufacturing tolerances.

A portion of the heat shield 60 can extend radially outward from the inner frame case 64 along the transfer tube 80 or the service line 68 to define the localized cooling cavity 86 (shown in FIG. 3). In further examples, the heat shield 60 extends radially outward to a radially outermost portion 97 of the transfer tube 80 (shown in FIG. 4C) to reduce communication of radiation from the airfoil 59 to the transfer tube 80.

During assembly, the flange 78 is inserted through the recess 91 of the inner frame case 64 in a direction from radially outward to radially inward. The fasteners 92 are tightened or secured as desired. The heat shield 60 is positioned over the flange 78 and secured to the inner frame case 64 utilizing fasteners 94. During disassembly, fasteners 94 are removed from the heat shield 60. The heat shield 60 is removed from the inner frame case 64. The flange 78 is moved through the recess 91 in a direction from radially inward to radially outward. Portions of the mid-turbine frame 57 or bearing compartment 38 radially inward of the outer diameter 63 of the inner frame case 64 can thereafter be accessed through the recess 91.

During operation of the gas turbine engine 20, the airfoils 59 are subjected to extreme temperatures in the core flow path C. The airfoils 59 are cooled by cooling airflow that is communicated to the airfoil cavity 74. The cooling airflow may be provided through a passage 55 (shown in FIG. 2) within one or more of the spokes 66, which accumulates within the bearing cavity 39, for example. A portion of the cooling airflow is communicated or directed from passages of the spokes 66, for example, to the inlet 87 of the heat shield 60 to cool the flange 78. The cooling airflow may be pressurized or communicated between the inlet 87 and outlet 88 of the localized cooling cavity 86 through convection. The relatively warm airflow is communicated or directed from the outlet 88 to the airfoil cavity 74. A portion of the cooling airflow exits at the airfoil 59 into the core flow path C through one or more film cooling holes (not shown), for example, or at another portion of mid-turbine frame 57.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A mid-turbine frame for a gas turbine engine, comprising:
   a first frame case;
   a flange coupling a conduit to the first frame case;
   a heat shield adjacent to the flange and spaced apart from adjacent spokes, the heat shield defining an opening for receiving the conduit; and
   wherein the heat shield defines a cooling cavity, and the cooling cavity has an outlet defined between an outer perimeter of the conduit and an inner perimeter of the opening such that the opening is in direct fluid communication with the cooling cavity;
   wherein the heat shield includes a first portion and a second portion, the first portion extends in a circumferential direction, the second portion extends in a radial direction and abuts the first frame case;
   wherein a perimeter of the heat shield mates with a perimeter of the flange; and
   wherein the cooling cavity has an inlet bounded by the first frame case and spaced apart from the conduit, the outlet has a ring shaped geometry, the first portion extends in an axial direction with respect to a longitudinal axis defined by the first frame case, the conduit extends in a radial direction with respect to the longitudinal axis, the first portion defines the outlet, the second portion defines the perimeter of the heat shield and extends in the radial direction with respect to the longitudinal axis, and the perimeter of the heat shield has a generally triangular geometry that defines the inlet.

2. The mid-turbine frame as recited in claim 1, wherein the flange is at least partially received in the first frame case.

3. The mid-turbine frame as recited in claim 1, comprising a second frame case coaxial with the first frame case, and wherein the conduit extends through an airfoil between the first and second frame cases.

4. The mid-turbine frame as recited in claim 3, wherein the first and second frame cases bound a core flow path, and the airfoil is positioned in the core flow path.

5. The mid-turbine frame as recited in claim 3, wherein the conduit includes a distal portion extending through the airfoil and a proximal portion coupled to the flange, the distal portion surrounded by an insulated sheath terminating at the proximal portion, and the heat shield extends a distance along the proximal portion.

6. The mid-turbine frame as recited in claim 3, wherein the conduit is configured to communicate fluid with a bearing compartment.

7. The mid-turbine frame as recited in claim 1, comprising:
a second frame case;
a plurality of spokes connecting the first and second frame cases; and
wherein the heat shield is spaced in a circumferential direction from each of the plurality of spokes.

8. A gas turbine engine, comprising:
a mid-turbine frame axially between a first turbine and a second turbine, the mid-turbine frame comprising:
a plurality of airfoils radially between an inner frame case and an outer frame case;
a plurality of flanges coupled to the inner frame case;
a plurality of conduits between the inner and outer frame cases, the plurality of conduits coupled to the plurality of flanges; and
a plurality of localized heat shields each corresponding to one of the plurality of flanges, each of the plurality of localized heat shields being spaced apart from each other;
wherein each of the plurality of localized heat shields includes a first portion and a second portion, the first portion extends in a circumferential direction, the second portion extends in a radial direction and abuts the inner frame case;
wherein a perimeter of each of the plurality of localized heat shields mates with a perimeter of a respective one of the plurality of flanges; and
wherein each heat shield of the plurality of heat shields defines a cavity between the inner frame case and one of the plurality of flanges, the cooling cavity has an inlet bounded by the inner frame case and spaced apart from a respective one of the plurality of conduits, the outlet has a ring shaped geometry, the first portion extends in an axial direction with respect to a longitudinal axis defined by the outer frame case, the conduit extends in a radial direction with respect to the longitudinal axis, the first portion defines the outlet, the second portion defines the perimeter of the respective one of the plurality of localized heat shields and extends in the radial direction with respect to the longitudinal axis, and the perimeter of the respective one of the plurality of localized heat shields has a generally triangular geometry that defines the inlet.

9. The gas turbine engine as recited in claim 8, wherein at least one of the plurality of conduits is configured to communicate cooling airflow with a bearing compartment.

10. The gas turbine engine as recited in claim 8, wherein the plurality of conduits include a first conduit and a second conduit, the first conduit being an oil supply line and the second conduit being an oil scavenge line, and each of the first and second conduits is coupled to a bearing compartment.

11. The gas turbine engine as recited in claim 8, wherein opposed walls of the inner and outer frame cases bound a core flow path, and the plurality of airfoils are located in the core flow path.

12. The gas turbine engine as recited in claim 11, wherein the plurality of localized heat shields are arranged between the plurality of airfoils and surfaces of the plurality of flanges.

13. The gas turbine engine as recited in claim 8, wherein each heat shield of the plurality of heat shields is spaced circumferentially about the inner frame case.

14. The gas turbine engine as recited in claim 13, wherein each of the plurality of localized heat shields defines an opening for receiving a respective one of the plurality of conduits, and the outlet is defined between an outer perimeter of a respective one of the plurality of conduits and an inner perimeter of the opening of a respective one of the plurality of localized heat shields such that the opening is in direct fluid communication with the cooling cavity.

15. A method of cooling a portion of a gas turbine engine, comprising:
directing cooling airflow through an inlet between a turbine case and a heat shield;
directing cooling airflow from the inlet to a cavity;
directing airflow from the cavity through an outlet between a conduit and the heat shield; and
wherein the cavity is defined between the heat shield and a flange, and the cavity is defined between the heat shield and the conduit coupled to the flange such that the cavity is in direct fluid communication with the outlet;
wherein the heat shield includes a first portion and a second portion, the first portion extends in a circumferential direction, the second portion extends in a radial direction and abuts the first frame case;
wherein a perimeter of the heat shield mates with a perimeter of the flange; and
wherein the inlet is bounded by the turbine case and is spaced apart from the conduit, the outlet has a ring shaped geometry, the first portion extends in an axial direction with respect to a longitudinal axis defined by the turbine case, the conduit extends in a radial direction with respect to the longitudinal axis, the first portion defines the outlet, the second portion defines the perimeter of the heat shield and extends in a radial direction with respect to the longitudinal axis, and the perimeter of the heat shield has a generally triangular geometry that defines the inlet.

16. The method as recited in claim 15, wherein the heat shield is arranged between an airfoil receiving the conduit and surfaces of the flange.

17. The method as recited in claim 16, comprising directing airflow from the outlet into an airfoil cavity defined by the airfoil, the airfoil cavity and the cooling cavity being separated by the heat shield, and the ring shaped geometry follows a perimeter of the conduit.

18. The method as recited in claim 15, wherein the conduit is coupled to a bearing compartment.

* * * * *

UNITED STATES PATENT AND TRADEMARK OFFICE
CERTIFICATE OF CORRECTION

Page 1 of 1

PATENT NO. : 9,869,204 B2
APPLICATION NO. : 14/640323
DATED : January 16, 2018
INVENTOR(S) : Joshua Daniel Winn et al.

It is certified that error appears in the above-identified patent and that said Letters Patent is hereby corrected as shown below:

In the Claims

In Claim 8, Column 9, Line 56; replace "the cooling cavity" with --the cavity--

In Claim 8, Column 9, Line 58-59; replace "the outlet has" with --and an outlet having--

In Claim 15, Column 10, Line 46; replace "the first frame case;" with --the turbine case;--

In Claim 17, Column 10, Line 65; replace "the cooling cavity" with --the cavity--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*